United States Patent [19]

Bonevento et al.

[11] Patent Number: 5,325,492

[45] Date of Patent: Jun. 28, 1994

[54] SYSTEM FOR ASYNCHRONOUSLY DELIVERING SELF-DESCRIBING CONTROL ELEMENTS WITH A PIPE INTERFACE HAVING DISTRIBUTED, SHARED MEMORY

[75] Inventors: Francis M. Bonevento; Joseph P. McGovern; Eugene M. Thomas, all of Boca Raton, Fla.

[73] Assignee: International Business Machines Corporation, Armonk, N.Y.

[21] Appl. No.: 76,081

[22] Filed: Jun. 11, 1993

Related U.S. Application Data

[63] Continuation of Ser. No. 411,145, Sep. 22, 1989, abandoned.

[51] Int. Cl.$^5$ ............................................. G06F 13/38
[52] U.S. Cl. .............................. 395/325; 364/DIG. 1; 364/440; 364/443; 364/281
[58] Field of Search ...................... 395/200, 325, 250

[56] References Cited

U.S. PATENT DOCUMENTS

| | | | |
|---|---|---|---|
| 4,212,057 | 7/1980 | Devlin et al. | 395/425 |
| 4,392,200 | 7/1983 | Arulpragasam et al. | 395/425 |
| 4,404,628 | 9/1983 | Angelo | 395/200 |
| 4,475,155 | 10/1984 | Oishi et al. | 395/275 |
| 4,523,274 | 6/1985 | Fukunaga et al. | 395/325 |
| 4,809,217 | 2/1989 | Floro et al. | 395/275 |
| 4,876,644 | 3/1989 | Nuechterlein et al. | 395/800 |
| 4,951,193 | 8/1990 | Muramatsu et al. | 395/650 |
| 5,003,463 | 6/1988 | Coyle et al. | 395/275 |
| 5,155,807 | 10/1992 | Blevins et al. | 395/200 |

Primary Examiner—Dale M. Shaw
Assistant Examiner—Lance Leonard Barry
Attorney, Agent, or Firm—Calfee, Halter & Griswold

[57] ABSTRACT

A microprocessor system includes a processor unit, one or more subsystem adapter units, optional I/O devices which may attach to the adapters, and a bus interface. Memory in the processor and memory in the adapters are used by the system as a shared memory which is configured as a distributed First In First Out (FIFO) circular queue (a pipe). Unit to unit asynchronous communication is accomplished by placing self-describing control elements on the pipe which represent requests, replies, and status information. The units send and receive self-describing control elements independent of the other units which allows free flowing asynchronous delivery of control information and data between units. The distributed, shares memory can be organized as pipe pairs between each pair of units to allow full duplex operation by using one pipe for outbound control elements and the other pipe for inbound control elements. The control elements have standard fixed header fields with variable fields following the fixed header. The fixed header allows a common interface protocol to be used by different hardware adapters. The combination of the pipe and the common interface protocol allows many different types of hardware adapters to asynchronously communicate, resulting in higher overall throughput due to lower interrupt overhead.

32 Claims, 13 Drawing Sheets

BASE SCB

| 31 30 | 29 28 27 26 | 25 | 24 23 22 | 21 20 19 18 17 16 | 15 14 13 12 11 10 9 8 7 6 5 4 3 2 1 0 |
|---|---|---|---|---|---|
| REQ | - - | I | - - - | SCB | ELEMENT LENGTH = 28 |
| SOURCE | | | | | DESTINATION |
| CORRELATION IDENTIFIER |||||||
| SCB ADDRESS |||||||
| SCB LENGTH IN BYTES |||||||
| RESERVED FOR STATUS DWORD 1 |||||||
| RESERVED FOR STATUS DWORD 2 |||||||

| REQ | S | C | I | N | W | E | READ LIST | ELEMENT LENGTH |
|-----|---|---|---|---|---|---|-----------|----------------|
| SOURCE |||||||| DESTINATION |
| CORRELATION IDENTIFIER |||||||||
| BYTE COUNT |||||||||
| DATA ADDRESS |||||||||
| OPTIONAL PARAMETERS |||||||||
| ⋮ |||||||||
| BYTE COUNT |||||||||
| DATA ADDRESS |||||||||
| OPTIONAL PARAMETERS |||||||||

*FIG. 12*

SYSTEM FOR ASYNCHRONOUSLY DELIVERING SELF-DESCRIBING CONTROL ELEMENTS WITH A PIPE INTERFACE HAVING DISTRIBUTED, SHARED MEMORY

This is a continuation of copending application(s) Ser. No. 07/411,145 filed on Sep. 22, 1989, now abandoned.

BACKGROUND OF THE INVENTION

Technical Field

The invention is in the field of computing systems, and in particular is directed to a command delivery mechanism. Specifically, the invention is directed to asynchronously delivering commands, replies, and status information between a personal computer class machine and a plurality of intelligent subsystems which may have attached devices.

CROSS REFERENCE TO RELATED APPLICATIONS

Reference is made to U.S. patent application Ser. No. 07/367,391 filed on Jun. 16, 1989, which is entitled "Interrupt Handling for a Computing System", which application is assigned to the assignee of this patent application, which describes an interrupt handing mechanism which may be utilized in the distributed pipe queueing system of the instant invention, and which is hereby incorporated by reference.

Reference is made to U.S. Pat. No. 5,131,082 which is entitled "Command Delivery for a Computing System", for Transfers Between a Host and Subsystem Including Providing Direct Commands or Indirect Commands Indicating the Address of the Subsystem control Block, which application is assigned to the assignee of this patent application, which describes a computing system in which may be utilized the distributed pipe queueing system of the instant invention, and which is hereby incorporated by reference.

In a data processing or computing system comprised of a host system and at least one subsystem, there is a need to communicate direct and indirect commands to an individual subsystem, usually over an Input/Output (I/O) channel.

The direct command is one which can be directly sent to a subsystem in one operation, is completely and totally self-contained, and totally specifies an operation to be executed by the subsystem. On the other hand, an indirect command is one which requires more data to specify the operation than can be provided within one channel I/O cycle. The indirect command is itself a pointer to a block of system memory which contains all the parameters necessary to specify an operation to be performed by the subsystem. This block of memory is often referred to as a "control block".

In a typical prior art computer system, the interface bus overhead involved with the transfer of control blocks limited the throughput capacity of subsystems and their respective I/O. The limitation is caused by the inability of the processor and the subsystem to form a synchronous connection on the bus due to other competing subsystems or processor tasks. Processor performance was impaired due to the inability of the processor to obtain service from adapters and I/O, and the performance of the adapters and I/O was impaired by the ability of the processor to send and receive data as quickly as the adapters and I/O were capable of processing it. As a result, there was a need to eliminate the bottleneck at the interface bus which allowed neither the processor nor the adapters and their respective I/O to perform as well as their hardware would allow.

According to the present invention, this need is met by creating a distributed pipe at the bus interface. The pipe allows the processor to asynchronously send and receive control blocks (for the purposes of this disclosure, the control blocks will hereinafter be referred to as control elements) for direct and indirect commands without requiring intervention by an adapter or I/O device. Likewise, the adapters and I/O can asynchronously send and receive control elements to the pipe without intervention by the processor. In addition, the pipe allows subsystem to subsystem control element transfer independent of processor intervention.

SUMMARY OF THE INVENTION

An object of this invention is to transfer control information and data between a processor and attached subsystems in an improved manner.

An object of this invention is to transfer control information and data between a processor and an attached subsystem independent of the availability of the attached subsystem.

An object of this invention is to transfer control information and data between a subsystem and a processor independent of the availability of the processor.

An object of this invention is to transfer control information and data between a processor and attached subsystems in full duplex mode.

An object of this invention is to asynchronously transfer control information and data between a processor and attached subsystems.

An object of this invention is to transfer control information and data between subsystems of a computer system without intervention of the processor.

An object of this invention is to transfer control information and data between a processor and a multiplicity of different subsystems on a common interface.

An object of this invention is to selectively transfer control information and data between a processor and subsystems on an asynchronous or synchronous basis.

The foregoing and other objects, features and advantages of the invention are achieved by using distributed shared memory, which is located in the processor and the subsystems, to form a distributed pipe organized as a First In First Out (FIFO) circular queue. Control elements are asynchronously placed on the pipe by the processor and by the subsystems. Each control element contains a fixed field carrying self describing information including the source and destination. A variable field follows the fixed field, and may contain data or a pointer to a buffer external to the pipe which can contain data or a list of commands to be executed (i.e., indirect commands). The fixed field also contains control bits which allow the subsystem and the processor to synchronously execute a repetitive list of control elements when necessary. The sending and receiving of control elements asynchronously to and from the pipe allow the processor and the subsystems to be free running, thereby avoiding interrupt delays. In addition, a common interface is achieved by the control element structure which allows different subsystem types to use the same pipe.

BRIEF DESCRIPTION OF THE DRAWINGS

FIG. 9 is a diagram of a base SCB.

FIG. 12 is a diagram showing the format of a read list request.

DESCRIPTION OF THE PREFERRED EMBODIMENT

By way of general overview, the invention allows a processor and a subsystem to asynchronously transfer data and control information and thereby avoid interrupt delays which degrade performance of the processor and the subsystem. In addition, the data and control information can also be asynchronously transferred between subsystems without processor intervention. The microprocessor system which includes a processor unit with system memory and a separate buffer memory, one or more subsystem adapter units with memory, optional I/O devices which may attach to the adapters, and a bus interface (which can interchangeably be called a micro channel). The memory in the processor and the memory in the adapters are used by the system as a shared memory which is configured as a distributed FIFO circular queue (a pipe). Unit to unit asynchronous communication is accomplished by placing control elements on the pipe which represent requests, replies, and status information. The units send and receive control elements independent of the other units which allows free flowing asynchronous delivery of control information and data between units. The shared memory can be organized as pipe pairs between each pair of units to allow full duplex operation by using one pipe for outbound control elements and the other pipe for inbound control elements. The control elements have standard fixed header fields with variable fields following the fixed header. The fixed header allows a common interface protocol to be used by different hardware adapters. The combination of the pipe and the common interface protocol allows many different types of hardware adapters to asynchronously communicate, resulting in higher overall throughput due to lower interrupt overhead.

An important feature of the invention is the use of a shared memory to hold the control information. The shared memory used to hold the control information is physically distributed between the processor and the subsystems and will hereafter be interchangeably referred to as a distributed pipe or a pipe. A unit of the system, such as a processor or subsystem adapter, can send self-describing control elements to the distributed pipe for later retrieval by another unit. The control elements carry commands, data, or addresses of data stored in a buffer which is external to the pipe. The unit of the system which is intended to receive the control element will retrieve it from the pipe as soon as it can, but does not require the sending unit to wait for the receiving unit to act. The sending unit can, therefore, place the control element in the distributed pipe and proceed to other work rather than waiting for a response from the other unit.

Figure 1:
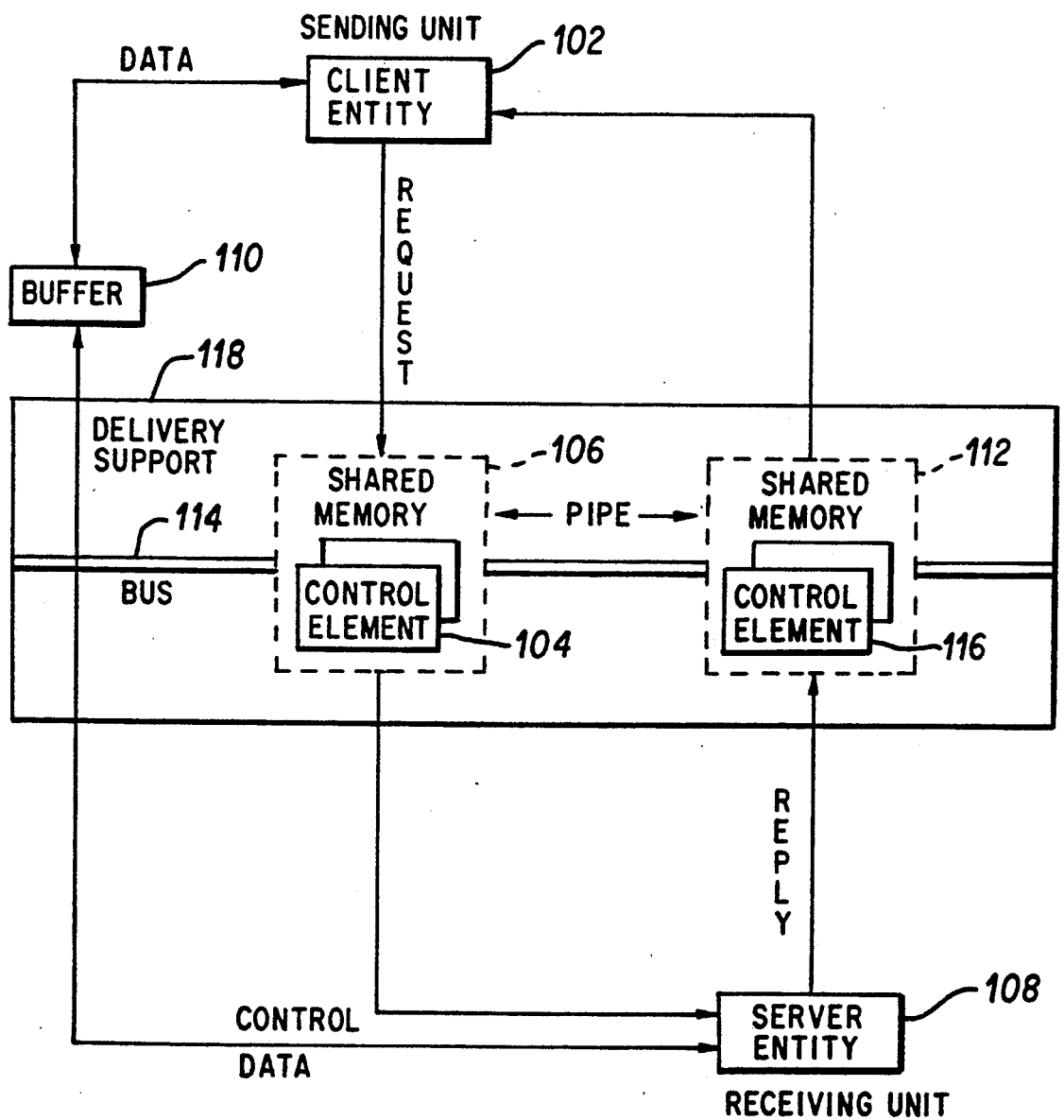
FIG. 1 is a simplified diagram of the invention using a single sending unit and a single receiving unit.

FIG. 1, used for illustrative purposes, is a simplified diagram of the invention which uses a single sending and receiving unit and a single pipe. In addition, the sending unit has a single client entity, which can be an application program or the like, and a single server entity, which, for example, may be an I/O device attached to a subsystem. It should be understood by those skilled in the art that, in practice, multiple sending and receiving units would be used, as well as multiple pipes, clients and servers. FIG. 1 shows the general flow of data and control information in the invention. The sending and receiving units 102, 108 comprise a unit pair which may be a processor unit and a subsystem unit, or both may be subsystem units. A sending unit 102, will request that a receiving unit 108 perform some work by placing a control element 104 into shared memory 106 (the distributed pipe). Commands and control information are contained in the control element 104. If data is to be transferred from the sending unit 102 to the receiving unit 108, it can be transferred in one of two ways. First, it can be directly transferred within a variable length field of the control element 104. The control element, including the placement of data within the control element, will be discussed in more detail below. Second, it can be placed in the buffer 110 by the sending unit 102. The sending unit 102 will then place the address and length of the data contained in the buffer 110 into the control element 104 prior to sending the control element 104 to the distributed pipe 106. It should be understood that the actual movement of data into and out of the buffer, as well as the pipe, can be accomplished by a number of conventional methods, well known in the art, such as through the use of DMA logic. As a general rule, it is preferable to use the external buffer 110 to transfer data since the distributed pipe 106 has a finite size and could be rapidly filled by the large data transfers used in many applications. At this point, the sending unit 102 does not have to wait for the receiving unit 108 to respond. The sending unit 102 can proceed with other tasks including the placement of other work requests in the distributed pipe 106 in the form of control elements 104.

The receiving unit 108 will retrieve control elements 104 from the pipe 106, execute the work request contained therein, and reply to the sending unit 102. If the control element 104 addresses data in the buffer 110, the receiving unit 108 will read or write the data from the buffer 110. When the work request is complete, the receiving unit will reply to the sending unit 102 by placing a control element 116 on the pipe 112. (Control elements 104 and 116 are functionally identical, as are pipes 106 and 112. They are identified separately to denote that the pipe is physically located in different units of the system. In addition, the preferred embodiment uses logically separate pipes for sending and receiving control elements.) As was the case with the sending unit 102, the receiving unit 108 does not wait for a response from the sending unit 102. It can proceed immediately to other work, including the retrieval of more control elements 104 from the pipe 106.

When the sending unit retrieves the control element 116 from the pipe 112 which contains the reply to the sending unit's 102 request, it can take the appropriate action based on the reply.

The logical steps discussed above are supported by the delivery support 118 (which includes a delivery send mechanism and a delivery receive mechanism) and the bus 114. The delivery support mechanism in the preferred embodiment is state logic well known in the art. Control information and data are physically moved to and from the sending and receiving units to the buffer 110 and the pipe 106, 112 by way of the bus 114. Further, the delivery support mechanism 118 includes the enqueue/dequeue logic (not shown) to control placement of control elements on the FIFO queue in pipe 106, 112.

Figure 2:
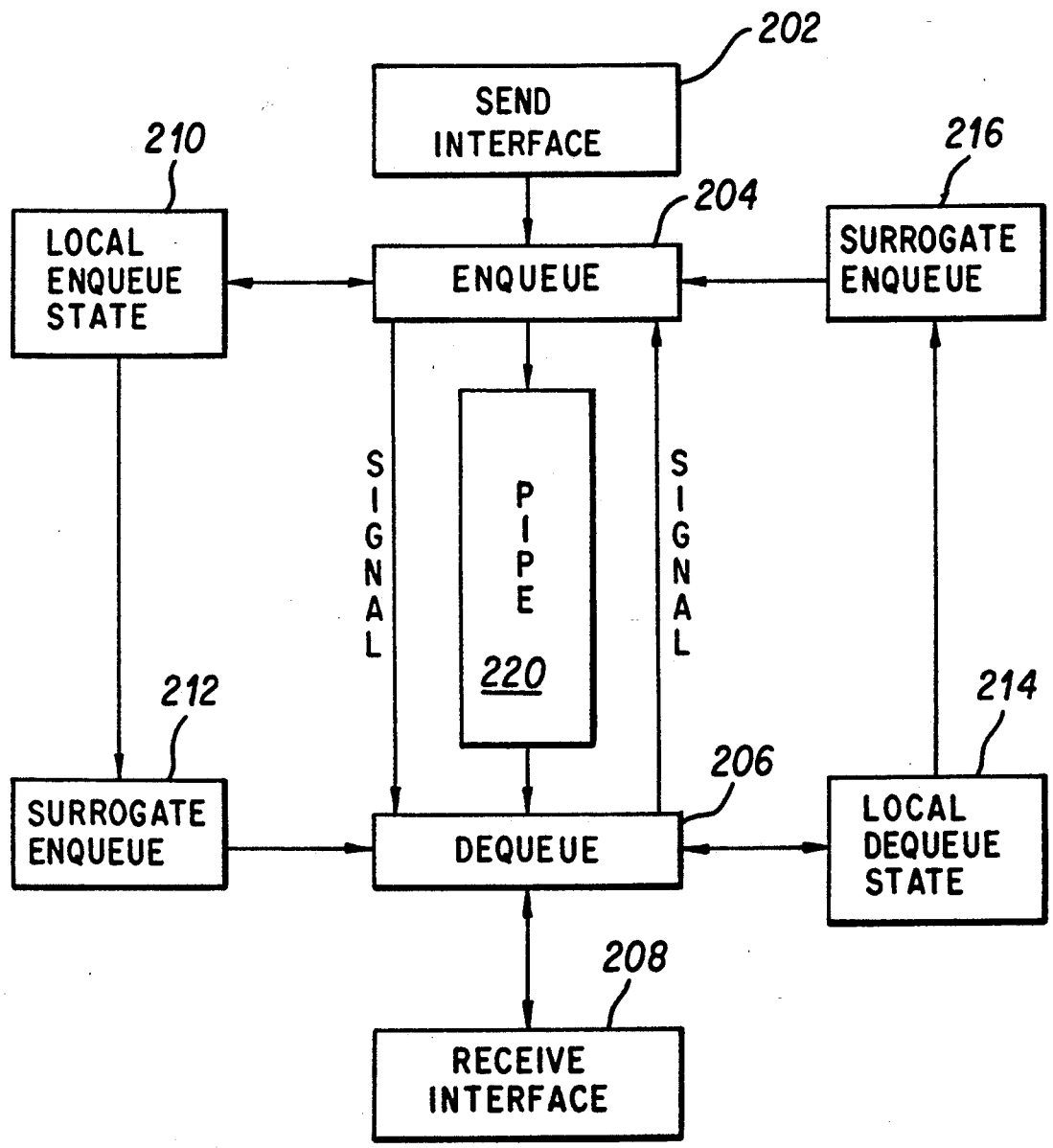
FIG. 2 is an overview diagram of the signalling mechanism used to notify units of the system.
Figure 3:
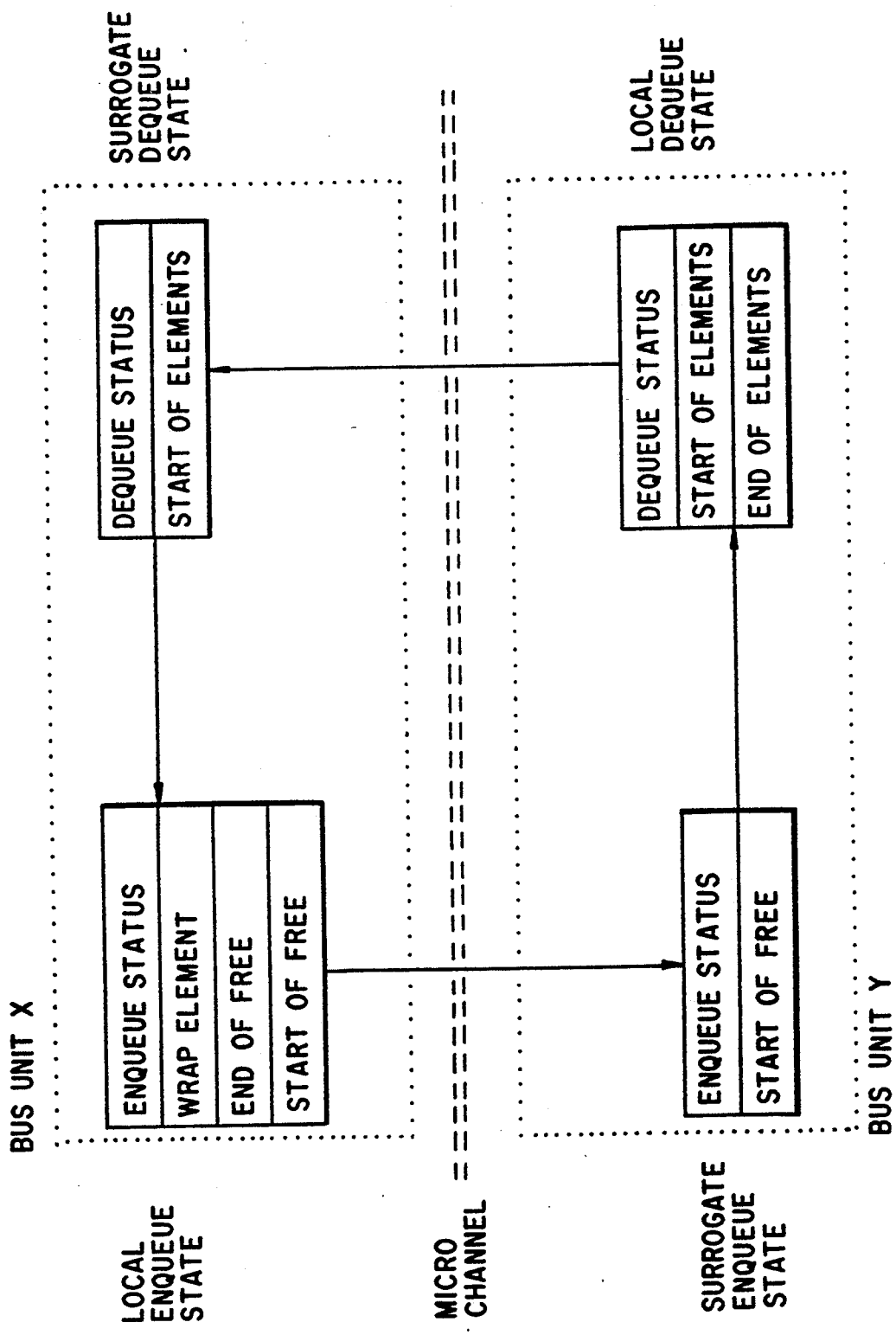
FIG. 3 is a block diagram of the state information used by the signalling mechanism in FIG. 2.
Figure 4:
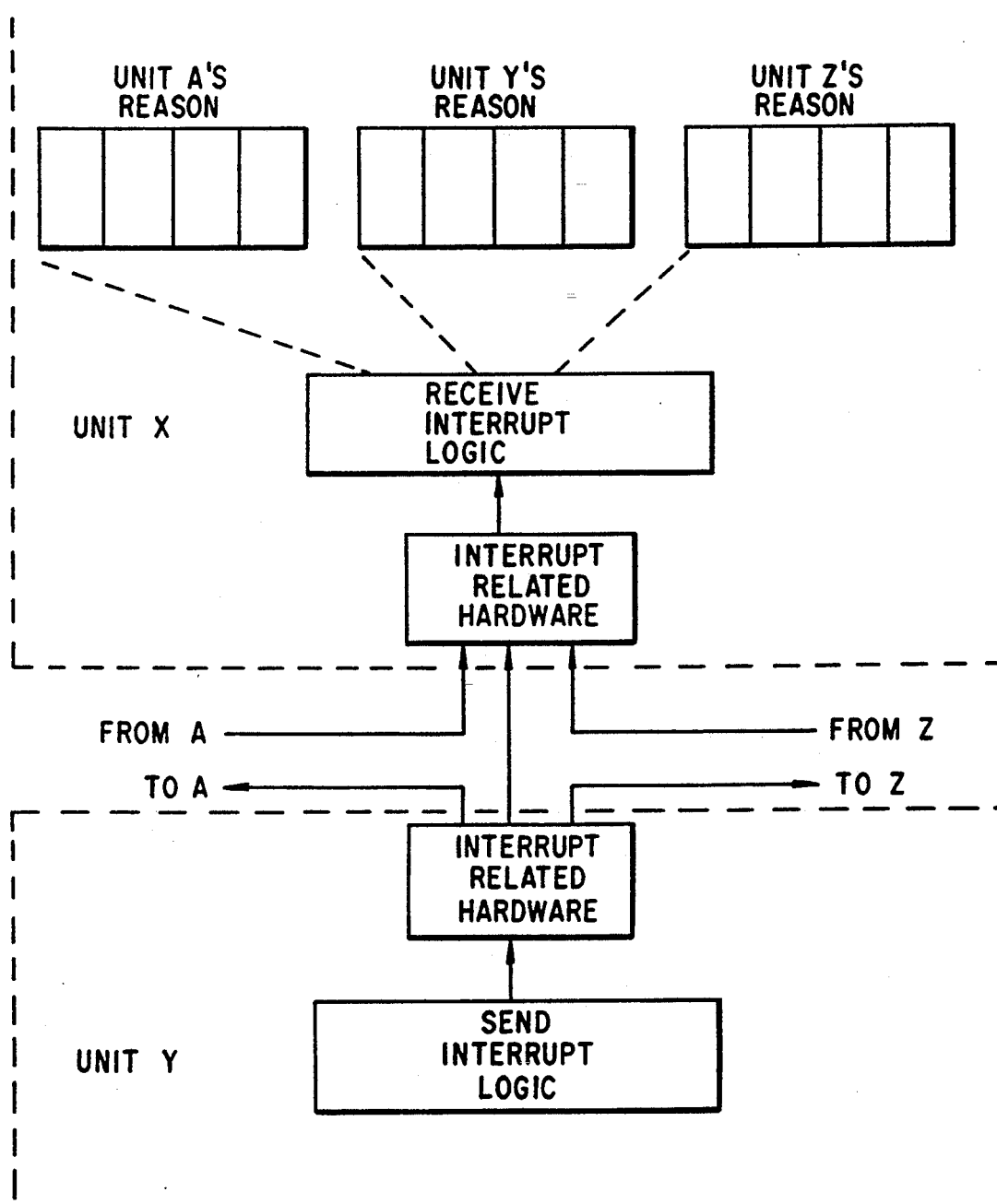
FIG. 4 is a diagram of the interrupt logic used by the system.

FIGS. 2, 3, and 4 show the basic mechanism used by the invention for signalling, state logic, and interrupt handling. The basic flow of control elements, shown in FIG. 2, operates using the send interface 202 and enqueue logic 204 to place control elements into a pipe 220. It then uses dequeue logic 206 and receive interface logic 208 to remove the control element from the pipe 220. The enqueue and dequeue logic use the state information shown in FIG. 3. There is also logic 210, 214 to recognize certain state changes in the pipe and to signal the other side. The signalling is done by pushing state change surrogate state information to the surrogate enqueue logic 212, 216, then pushing reason codes to the reason area (shown in FIG. 4) for this unit. Once the surrogate information and reason information is pushed, a hardware level primitive causes an interrupt (shown in FIG. 4). The hardware primitive may be either interrupt controller hardware or may be done by writing I/O ports or mapped memory locations which cause hardware interrupts.

Figure 5:
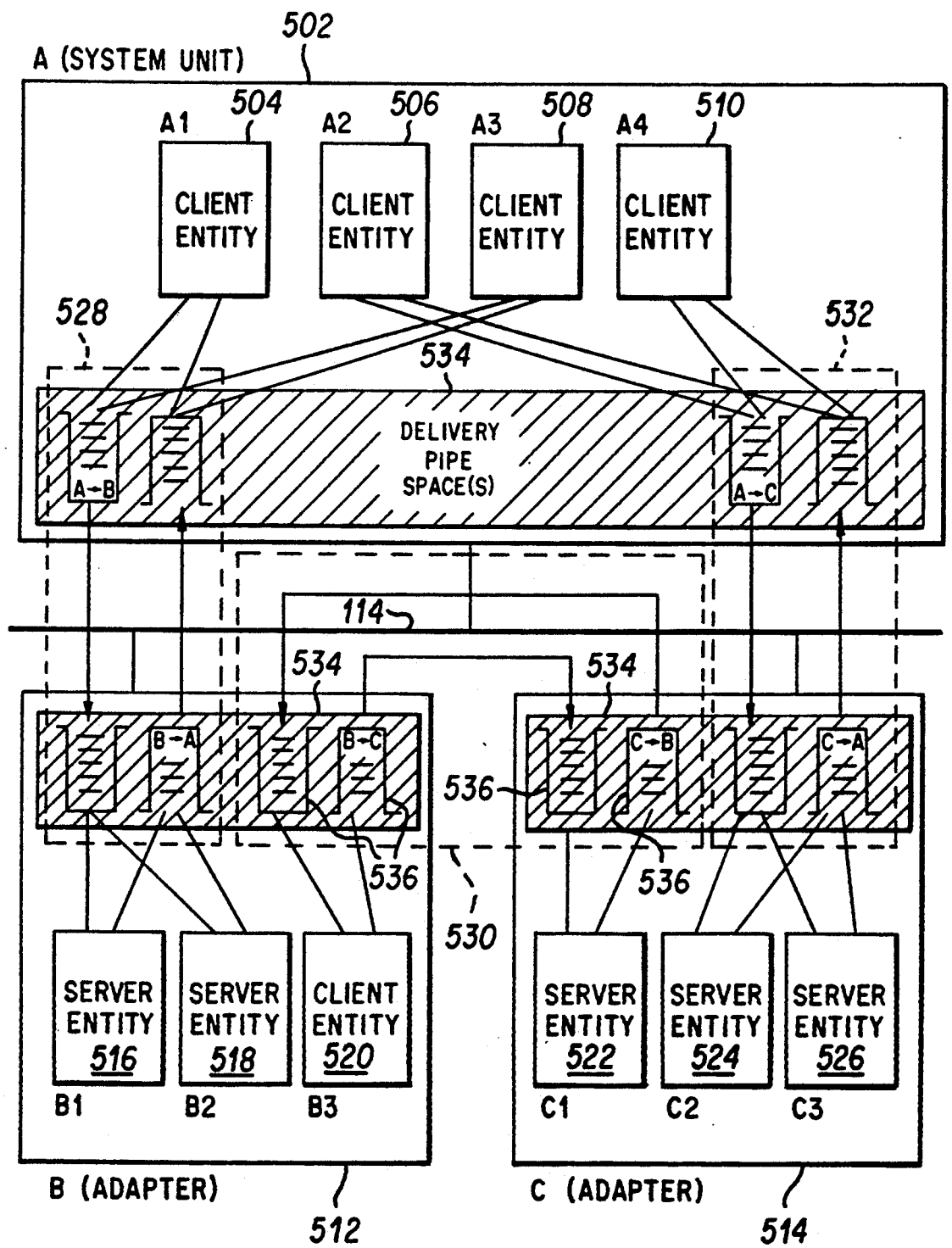
FIG. 5 is a diagram of the invention using multiple subsystems and entities.

FIG. 5 shows a structure which is more representative of the invention in actual use than FIG. 1. However, as in the discussion of FIG. 1, the actual number of entities is not limited to the number of entities shown, but is instead a function of the hardware capacity of the particular system components in question. FIG. 5 shows a processor unit 502 which includes multiple client entities 504, 506, 508, 510. Each entity may be a program or some other system task which requires interaction with subsystem units. The subsystems are represented in the figure as they would typically appear in practice, as adapter cards 512, 514. Each adapter 512, 514 in turn has multiple server entities 516, 518, 520, 522, 524, 526 which may be I/O devices such as communication lines, printers, terminals, or the like. FIG. 5 also illustrates the use of multiple distributed pipes 528, 530, 532 within a shared memory 534. As shown, pipes for unit pairs can be used by processor/subsystem unit pairs 502/512 and 502/514, or by subsystem/subsystem unit pairs 512/514. Each of the pipes would move control elements 536 on the bus 114, as discussed above in the description of FIG. 1.

Figure 6:
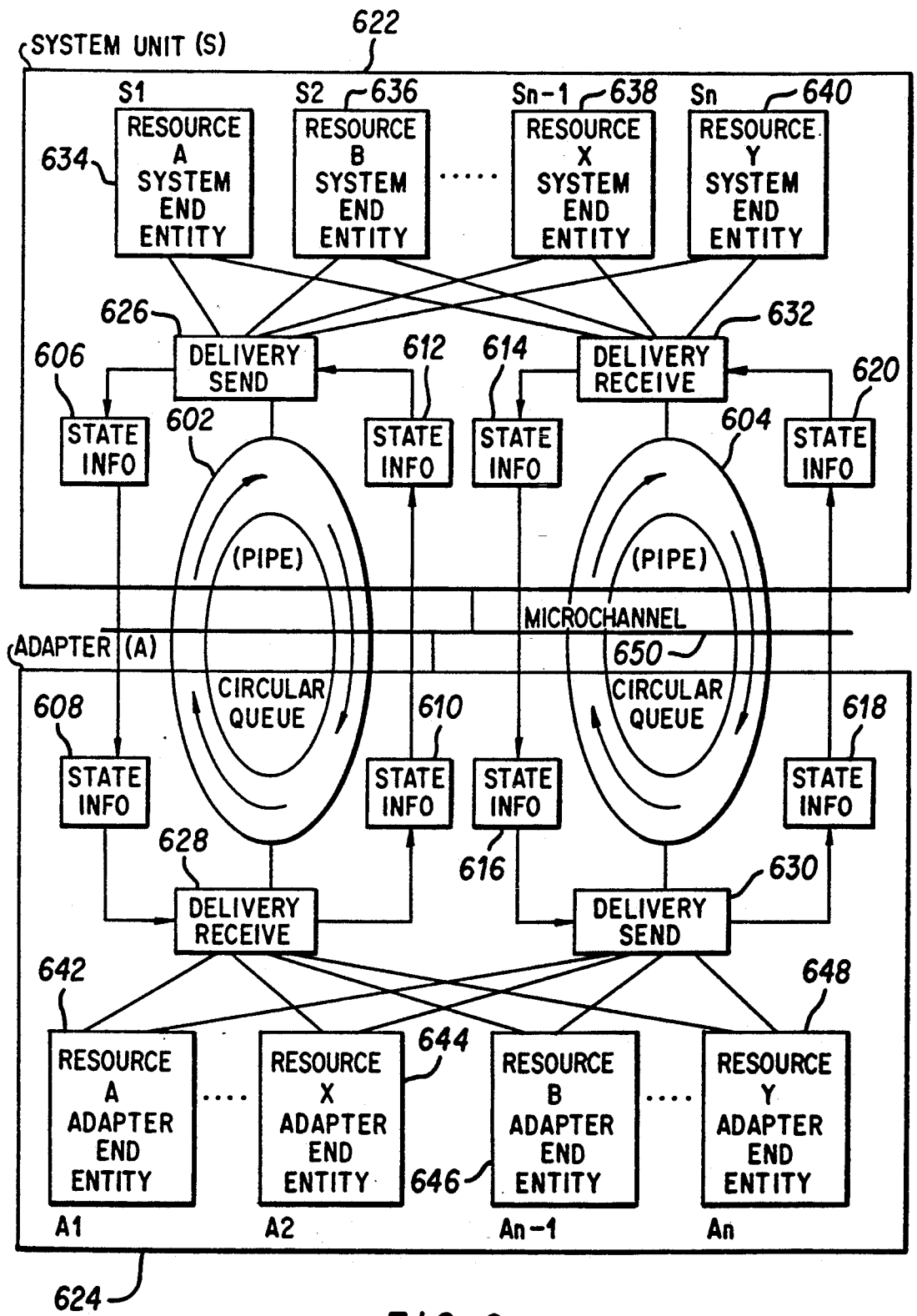
FIG. 6 is another diagram of the invention using multiple subsystems and entities, which also shows the delivery send mechanism and the delivery receive mechanism.

FIG. 6 is a diagram showing the general arrangement of the invention which is designed to show the relationship between the circular pipe and the system. There are a pair of circular pipes 602, 604 which deliver control elements in opposite directions. The basic operation of each is the same. There is state information 606, 608, 610, 612, 614, 616, 618, 620 needed for the enqueueing and dequeueing of control elements (not shown). The state information is distributed between the two units 622, 624. The delivery support 626, 628, 630, 632 is shared between multiple entity to entity pairs 634, 636, 638, 640, 642, 644, 646, 648. Portions of the delivery support communicate with each other over the micro channel 650.

Figures 7, 8:
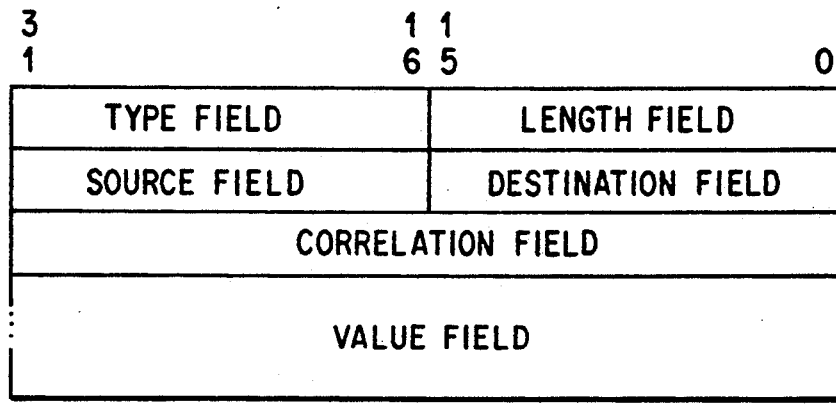
FIG. 7 is a diagram of a control element.
FIG. 8 is a diagram of an immediate Subsystem Control Block (SCB) command.

FIG. 7 shows the arrangement of fields in a control element. A general discussion of how the invention uses the control elements follows.

Work Orders:

Requests and the replies to those requests, are exchanged between clients (entities) in a system unit or adapter, and servers (entities) in an adapter or system unit using the delivery services of the SCB architecture. These requests, as well as their corresponding replies, are referred to as work orders. Each work order consists of a control element used to describe the unit of work being requested, and one or more control elements used to indicate the completion or current state of the requested unit of work. Error conditions or changes in the processing state of a unit of work are reported in error and event control elements respectively. Using this definition, each of the following would be a valid work order:

a single request element with no reply element;
a single request element with a single reply element;
a single request element with multiple reply elements;
a single request element with an error element;
a single request element with an event element;
a single request element with both event and error elements;
a single request element with event, reply, and error elements.

When request elements are chained together, each request element in the chain is treated as one part of a single work order.

Elements:

Elements, or more precisely control elements, are used to exchange control information and, in some cases, data between a client and a server. They are like an envelope with a see through window; allowing the delivery service to use information in the window to deliver the control elements without having to know or understand what is contained within the remainder of the control element. Typically, a control element contains the following:

a 16 bit type field
a 16 bit length field
a 16 bit source field
a 16 bit destination field
a 32 bit correlation field
a variable length value field The first five fields are used by the delivery service as well as the client and server. It constitutes the information visible through the window in the envelope. The remaining field, the value field, contains the contents of the envelope. It contains information meaningful only to the client and the server.

The following sections describe in more detail, the format and content of each of these fields as it pertains to the delivery service.

Type Field:

The type field of an element is a 16 bit word used to identify an element and indicate how to interpret the remaining fields within the element. The type field consists of the following sub-elements:

EID element identifier—a (2) bit sub-field used to identify the element type. There are four element types:
1—request (00)—An element sent by a client to a server asking it to perform a unit of work on its behalf. It requires the transfer of data and control information between a client and the server.
2—reply (01)—An element sent by a server in response to certain request elements. Not all request elements are answered by replies, only those that request information.
3—event (10)—An element containing information about the progress of a request, about the side-effects of a previous request or about the status of an entity. Events may be sent by either a server or a client.
4—error (11)—An element that provides error information about a previous request, or about the health and welfare of a server or delivery agent.

S suppress reply flag—indicates whether or not the client wants the server to return a reply element when the processing of this request element has been completed successfully. When set to one, the reply is suppressed and no reply element will be returned. When set to zero, whether or not a reply is returned is determined by the entity to entity protocol.

O chaining flags—indicate whether or not command chaining is in effect. When chaining is in effect and all elements in the chain represent a single unit of work, to be processed in the order in which they appear. The following table indicates how the chain bits are to be interpreted: 00—indicates no chaining (first and last)
01—indicates the start of a command chain (first element)
11—indicates an element within the chain (intermediate element)
10—indicates the end of chain (last element)

I indirect flag—indicates whether the value field of the element contains the parameters for the specified function or just the length of, and a pointer to, a data area where the actual parameters are stored. When set to one, the value field contains a pointer to the parameter value.

N notification flag—indicates whether or not the client is requesting notification by the server when processing of this element begins. When set to one, a notification is to be returned to the client using a notification event element.

W wait flag—indicates whether or not the client is requesting the server to wait before processing this request element, or any other request elements from this client, until it is told to do so with a subsequent resume event element from the client. When set to one, processing is to be suspended.

E expedite flag—identifies a control element that the client wants the server to process as expeditiously as possible, i.e. before any other control elements that may be waiting to be processed. When set to one, the control element is to be expedited.

FC function code—a seven (7) bit sub-field used to identify the function to be performed and indicate how to interpret the contents of the value field.

Length Field

The length field of an element is a 16 bit word used to specify the total length of the element in bytes. This includes 2 bytes for the type field, 2 bytes for the length field, 2 bytes for the source field, 2 bytes for the destination field, 4 bytes for the correlation field, and n bytes for the variable length value field.

Source Field

The source field is a 16 bit word used to identify the originator or source of an element. It is a structured field containing a unit identifier and an entity identifier. For the Micro Channel, the unit id is the bus unit with an allowable range of 0 to 15, and the entity id is one of 256 possible sources. Entity id zero (0) is reserved for management purposes. Together, they provide sufficient information to unambiguously identify a bus unit as well as the entity within the bus unit responsible for originating the element.

Destination Field

The destination is a 16 bit word used to identify the target or destination of an element. Like the source field, it to is a structured field containing a unit identifier and an entity identifier For the Micro Channel, the unit id is the bus unit with an allowable range of 0 to 15, and the entity id is one of 256 possible destinations. Entity id zero (0) is reserved for management purposes. Together, they provide sufficient information to unambiguously identify the bus unit and the entity within the bus unit who is the recipient of the element.

Correlation Field

The correlation field is a 32 bit doubleword used to provide an identifier for associating or correlating a response with a previous request. The format and content of the correlation identifier is determined by the entity who is the originator of the request. It may be a sequence number, the address of a control block or request packet, or the address of a data buffer. The correlation identifier is returned to the originator of the request in a reply, error, or event element.

Value Field

The value field of an element is a variable length field used to hold additional arguments, parameters, or data required by the operation identified by the function code in the type field. The type, length, and format of this information will vary depending on the function specified.

Function Codes

Within an element, a function code is used to identify the operation to be performed and to indicate how the contents of the value field should be interpreted. The High order bit of the function code is used to distinguish between common usage function codes and implementation defined function codes. When bit 6 is set to one (1), it indicates that the remaining bits (0–5) contain a non-architected function code. When set to zero (0), bit 6 indicates that the remaining bits (0–5) contain one of the following common usage function codes:
Immediate SCB Command (FC=1)
Initialize (FC=2)
Base SCB Command (FC=3)
Read (FC=4)
Read List (FC=5)
Read Immediate (FC=6)
Write (FC=7)
Write List (FC=8)
Write Immediate (FC=9)
Execute List (FC=10)
Mark (FC=11)

Cancel (FC=12)
Reset (FC=13)
Read Configuration (FC=14)
Diagnose (FC=15)
Suspend (FC=16)
Resume (FC=17)
Notify (FC=18)
Inform (FC=19)
Wrap (FC=31)

Function codes 0, 20 through 30, and 32 through 63 are reserved and should be treated as an error condition if found in a control element.

The suspend, resume, notify, inform, and wrap function codes are used exclusively with the event element. All other function codes are used with request, reply, and error elements.

The following sections describe in detail the format, content and usage of the above functions in the various element types of the extended Subsystem Control Block (SCB) architecture support.

Immediate SCB

The Immediate SCB elements provide a path for certain forms of adapter migration. They allow the delivery service to be used with the existing SCB's. The format and content of this element is shown in FIG. 8.

Initialize

The Initialize function is found in request, reply, and error elements. In a request element, it invokes the initialization function of the server. The source and destination, a correlation identifier, and the value field containing any additional parameters required by the server initialization function are passed to the server in the request element. The initialization parameters passed in the value field of the request element are server dependent and will need to be defined on a server by server basis.

If the indirect flag is set in the type field of the initialization request element, the value field does not contain the actual initialization parameters, but instead contains the location and the length of a data area where the actual parameters themselves are stored.

A server reports the successful completion of an initialization request by returning a reply element to the requestor. The source and destination, the correlation identifier from the initialization request element, and any return values are placed in the value field of the reply element.

The return parameters passed in the value field of the reply element are server dependent and will need to be defined on a server by server basis.

A client may choose to suppress the returning of a reply element by setting the suppress flag in the Type Field of the initialization request element.

If unsuccessful, the source and destination, the correlation identifier from the initialization request element, and status information identifying the cause of the failure are returned to the requestor in the value field of an error element.

Base SCB

The base SCB elements provide a path for certain forms of adapter migration. They allow the delivery service to be used with the existing SCB's. The format and content of these elements is shown in FIG. 9.

Read

The Read function is found in request, reply, and error elements. In a request element, it is used to setup and initiate the transfer of data and control information from the server to a client. The source and destination, a correlation identifier, and the value field containing the parameters required by the server read function are passed to the server in the request element.

It should be noted that the parameters contained in the value field of a request element are not limited to those identified above. Additional parameters may be supplied to meet the requirements of each client/server relationship.

If the indirect flag is set in the type field of the read request element, the value field does not contain the byte count, data address and optional parameters, but instead contains the location and the length of a data area where they are stored. When the server has successfully completed the transfer, it returns a reply element with the source and destination, the correlation identifier from the read request element, and the actual number of bytes transferred in the value field of the reply element.

A client may choose to suppress the returning of a reply element by setting the suppress flag in the Type Field of the read request element.

If unsuccessful, an error element containing the source and destination, the correlation identifier from the read request element, and status information identifying the cause of the failure, are returned to the requestor in the value field of the error element.

Read List

The Read List function is found in request, reply, and error elements. It is used to setup and initiate the transfer of data and control information from a server into several possibly non-contiguous areas of memory. This is often referred to as data chaining. The source and destination, a correlation identifier, and the value field containing the list of byte count/data address pairs required by the read list function are passed to the server in the request element.

If the indirect flag is set in the type field of the read list request element, the value field does not contain the list of byte counts and data address, but instead contains the location and the length of an area where the actual list is stored.

When the server has successfully completed the transfer, it returns a reply element with the source and destination, the correlation identifier from the read list request element, and residual byte count in the value field of the reply element. The format and content of the read list reply element is the same as the read reply.

A client may choose to suppress the returning of a reply element by setting the suppress flag in the Type Field of the read list request element.

If unsuccessful, an error element containing the source and destination, the correlation identifier from the read list request element, and status information identifying the cause of the failure, are returned to the requestor in the value field of the error element. The format and content of the read list error element is the same as the read error.

Read Immediate

The Read Immediate function is found in request, reply, and error elements. It is used to request the transfer of data and/or control information from a server to a client. It differs from the read request in that the data is to be returned in the value field of the reply element where it will be immediately available to the client. The source and destination, a correlation identifier, and the value field containing the parameters required by the read immediate function, are all passed to the server in the request element.

The amount of data that can be returned using the read immediate request element is configuration dependent. That is, it is directly related to the size of the delivery queue. Therefore, care should be exercised when using this request element.

When the server has successfully completed the transfer, it returns a reply element with the source and destination, the correlation identifier from the read immediate request element and, in the value field, the actual number of bytes transferred followed immediately by the data itself.

The read immediate function ignores the suppress flag if set in the Type Field of the read immediate request element since it always returns a reply element.

If unsuccessful, an error element containing the source and destination, the correlation identifier from the read immediate request element, and status information identifying the cause of the failure, are returned to the requestor in the value field of the error element.

Write

The Write function is found in request, reply, and error elements. It is used to setup and initiate the transfer of data and control information from a client to a server. The source and destination, a correlation identifier, and the value field containing the amount and location of the data to be transferred by the write function, are all passed to the server in the request element.

It should be noted that the parameters contained in the value field of a request element are not limited to those identified above. Additional parameters may be supplied to meet the requirements of each client/server relationship.

If the indirect flag is set in the type field of the write request element, the value field does not contain the byte count, data address and optional parameters, but instead contains the location and the length of a data area where they are stored.

When the server has successfully completed the transfer, it returns a reply element with the source and destination, the correlation identifier from the write request element, and the actual number of bytes transferred in the value field of the reply element.

A client may choose to suppress the returning of a reply element by setting the suppress flag in the Type Field of the write request element.

If unsuccessful, an error element containing the source and destination, the correlation identifier from the write request element, and status information identifying the cause of the failure, are returned to the requestor in the value field of the error element.

Write List

The Write List function is found in request, reply, and error elements. It is used to setup and initiate the transfer of data and control information to a server from several possibly non-contiguous areas of memory. This is often referred to as data chaining. The source and destination, a correlation identifier, and the value field containing the list of byte count/data address pairs required by the write list function, are all passed to the server in the request element.

If the indirect flag is set in the type field of the write list request element, the value field does not contain the byte counts and data address, but instead contains the location and the length of an area where the actual list is stored.

When the server has successfully completed the transfer, it returns a reply element with the source and destination, the correlation identifier from the write list request element, and residual byte count in the value field of the reply element. The format and content of the write list reply element is the same as the write reply.

A client may choose to suppress the returning of a reply element by setting the suppress flag in the Type Field of the write list request element.

If unsuccessful, an error element containing the source and destination, the correlation identifier from the write list request element, and status information identifying the cause of the failure, are returned to the requestor in the value field of the error element. The format and content of the write list error element is the same as the write error.

Write Immediate

The Write Immediate function is found in request, reply, and error elements. It is used to carry data and/or control information from a client to a server. It differs from the write request in that the data is present in the value field of the request element and is immediately available to the server. The source, destination, and correlation identifier, as well as the data itself, are all passed to the server in the request element.

The format as well as the meaning of the data contained in the value field of the request element are client/server dependent and as such are not defined here.

The amount of data that can be transferred using the write immediate request element is configuration dependent. That is, it is directly related to the size of the delivery queue. Therefore, care should be exercised when using this request element.

When the server has successfully received the data, it returns a reply element with the source and destination, the correlation identifier from the write immediate request element and, in the value field, a count of the actual number of bytes received.

A client may choose to suppress the returning of a reply element by setting the suppress flag in the Type Field of the write immediate request element.

If unsuccessful, an error element containing the source and destination, the correlation identifier from the write immediate request element, and status information identifying the cause of the failure, are returned to the requestor in the value field of the error element.

Execute List

Figure 10:
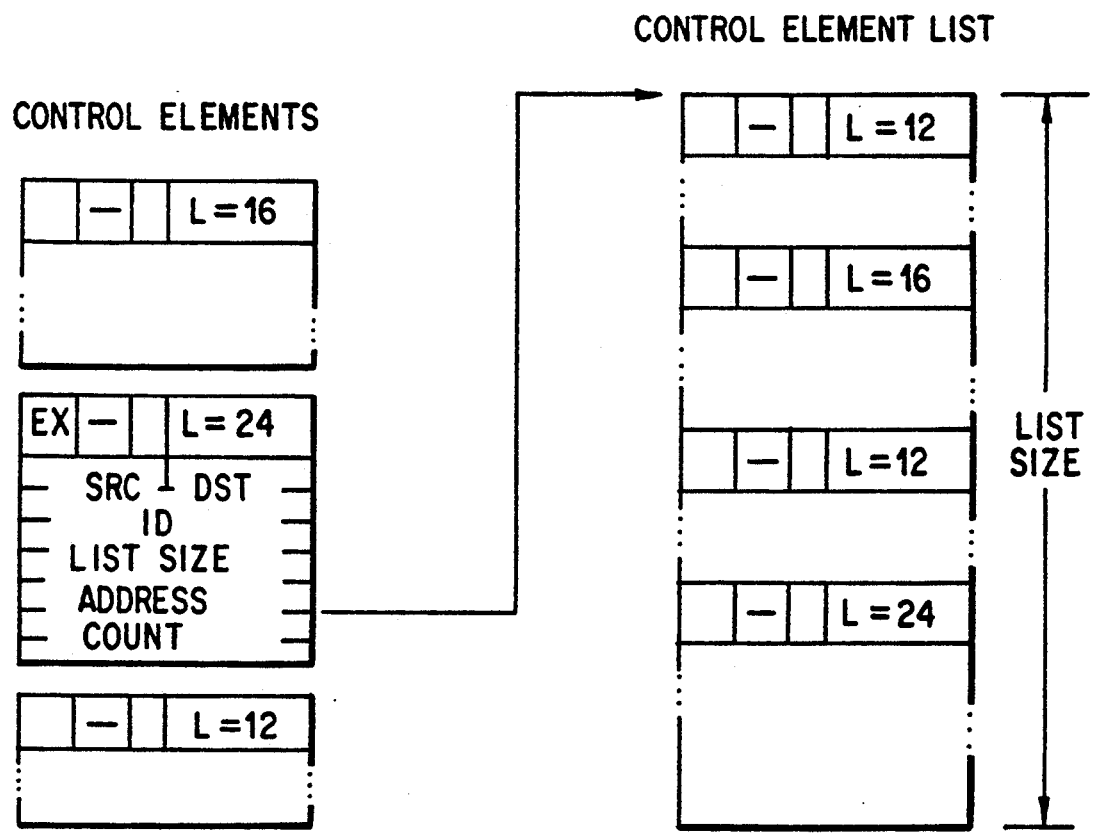
FIG. 10 is a diagram of an execute list.

FIG. 10 shows an example of an execute list. The Execute List function is indicated in the type field of request and reply elements. It is used to setup a repetitive loop for executing a list of request elements pointed to by this element one or more times. The source and destination, a correlation identifier, and the value field containing the location, length, and count required by the execute list function, are all passed to the server in the request element.

A list of requests to be executed may consist of one or more request elements which must be contiguous in memory. Each element in the list contains its own length field so that the start of the next element can easily be determined. The "length of list" field determines where the list ends. On each pass through the list, the repetition count is decremented by one, and if not zero, the list is executed again. If the initial repetition count is negative or zero the request terminates with no execution.

The request elements that make up the list can contain any of the function codes defined in this section and use any of the optional flags available to them.

When the repetition count goes to zero, the list is terminated and the server returns a reply element with the source, destination, and correlation identifier from the original execute list request element.

A client may choose to suppress the returning of a reply element by setting the suppress flag in the Type Field of the execute list request element.

Should an error occur while processing any element within the list, the list will be terminated. The error element returned, however, will be that of the offending request element.

Mark

The Mark function is used only in a request element to provide a means of marking or indicating a point of possible synchronization between a client and a server. It performs no other function other than the passing of a correlation identifier to the server.

The power of this function is in the way it can utilize the Notify and Wait flags to inform a client of the current processing state of the server.

The Mark function ignores the indirect, suppress, and expedite flags if set in a mark request element.

Cancel

The Cancel function is used in request, reply, and error elements. In a request element, it is used to request the cancellation of one or more outstanding request elements. The source and destination, a correlation identifier, and the value field containing the cancellation qualifier and an optional list of request element correlation identifiers are all passed to the server in the request element.

The cancellation qualifier bits define which request elements are to be cancelled:
  all outstanding requests - (bit 0=1)
  requests that match the source ID - (bit 1=1)
  first request matching the cancellation list value(s) - (bit 2=1)
  all requests matching the cancellation list values(s) - (bit 3=1)

A cancellation list is present whenever bits 2 or 3 of the cancellation qualifier are set to one. If bit 1 is set, then bit 2 or 3 must also be set.

If the indirect flag is set in the type field of the cancel request element, the value field does not contain the cancellation list, but instead contains the location and the length of a data area where the actual list is stored.

When the server has successfully completed the cancel function, it returns a reply element to the requestor. The source and destination, as well as the correlation identifier from the cancel request element are returned in the reply element.

The server will attempt to cancel all requests whose correlation identifiers are in the value field of the cancel request. If for any reason the server is unable to do so, it will return an error element with status and a list of correlation identifiers for those it was able to cancel. An empty list indicates that it was unable to perform the cancel.

However, a cancel request element with the all outstanding elements qualifier will not return an error element with the list of cancelled elements.

Reset

The Reset function is used in request, reply, and error elements. In a request element, it is used to request the server be placed into a known state. The source and destination, a correlation identifier, and the value field containing the desired state, are all passed to the server in the request element.

When the server has successfully completed the reset, it returns a reply element with the source and destination, the correlation identifier from the reset request element to the requestor.

The reset function ignores the suppress and indirect flags if set in a reset request element.

If unsuccessful, an error element containing the source and destination, the correlation identifier from the reset request element, and status information identifying the cause of the failure, are returned to the requestor in the value field of the error element.

Read Configuration

The Read Configuration function is used in request, reply, and error elements. When used in a request, it causes the server to return configuration information to the client. The source and destination, a correlation identifier, and the value field containing the byte count, data address, and optionally the specific configuration information to be returned, are passed to the server in the request element.

It should be noted that the parameters contained in the value field of a request element are not limited to those identified above. Additional parameters may be supplied to meet the requirements of each client/server relationship.

If the indirect flag is set in the type field of the read configuration request element, the value field does not contain the optional parameters, but instead contains the location and the length of a data area where the actual parameters themselves are stored.

A server reports the successful completion of a read configuration request by returning a reply element to the requestor. The source, destination, and correlation identifier from the read configuration request element are returned in the value field of the reply element.

A client may choose to suppress the returning of a reply element by setting the suppress flag in the Type Field of the read configuration request element.

If the server is unable to report back configuration information, an error element with the source and destination, the correlation identifier from the read configuration request element, and the reason are returned to the requestor in the value field of the error element.

Diagnose

The Diagnose function is used in request, reply, and error elements. In a request, it is used to initiate the running of diagnostic routines by a server. The source and destination, a correlation identifier, and the value field containing the specific diagnostic tests to be run as well as any operational parameters, are passed to the server in the request element.

If the indirect flag is set in the type field of the diagnose request element, the value field does not contain the optional parameters, but instead contains the location and the length of a data area where the actual parameters themselves are stored.

A server reports the results of running the diagnostic tests by returning a reply element to the requestor. The source and destination, correlation identifier from the diagnose request element, and the value field containing the test results are returned in the reply element.

A client may choose to suppress the returning of a reply element by setting the suppress flag in the Type Field of the diagnose request element.

If a server is unable to run the requested diagnostic test, an error element with the source and destination, the correlation identifier from the diagnose request element, and the value field containing the reason are returned to the requestor in the error element.

Events

In addition to request, reply, and error elements, the delivery service provides an element for conveying information about the progress of a request, or about the side-effects of a previous request, or about the state of an entity—the event element. The event element differs from the other elements in that it reports a change in state of one of the communicating entities (client or server). Because of the impact of these state changes, the peer-entity must be informed of the change as expeditiously as possible. The following sections describe the format, content and usage of the function code of an event element.

Suspend

A suspended event is used to notify a client of a change in processing state at the server. A server changes state whenever it receives a request element from a client in which the wait flag of the type field is set to one. The server suspends the processing of the request and all subsequent requests from the specified source. This change of state is communicated to the client by means of a suspend event element. The source and destination, as well as the correlation identifier of the request element causing the suspension, are returned to the client in the value field of the event element.

Resume

A resume event is used to notify a server of a change in a clients processing state. A client uses this event to notify a server that the client is now in a state where the processing of request elements can now be resumed. The source and destination, as well as the correlation identifier of the original request element causing the suspension, are returned to the server in the value field of the resume event.

A resume event received from a source other than the one responsible for the suspended state or the receipt of a resume for a destination that is not in the suspended state, will be ignored.

Notification

A notification event is used to confirm the receipt of a request element from a client in which the notification flag of the type field is set to one. The server communicates this to the client by means of a notification event element. The source and destination, as well as the correlation identifier of the request element containing the notification flag, are returned to the client in the value field of the event element.

Inform

An inform event is used to provide a means of conveying information regarding the processing state of either a client or a server from one to other.

Wrap

A wrap event is a management and control initiated event used internally by the delivery system. It is used to synchronize the operations associated with the inbound or out-bound delivery pipes (queues).

A wrap event element can be sent only by a delivery agent. The wrap event informs the destination delivery agent that the associated delivery queue has wrapped and that the next element should be dequeued from the top of the delivery queue.

Command Chaining

Figure 11:
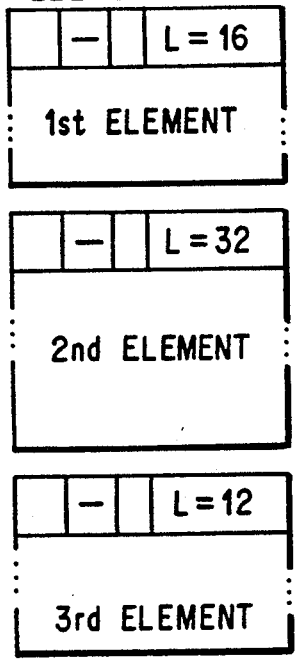
FIG. 11 is a diagram of the control elements used for command chaining.
Figure 11:
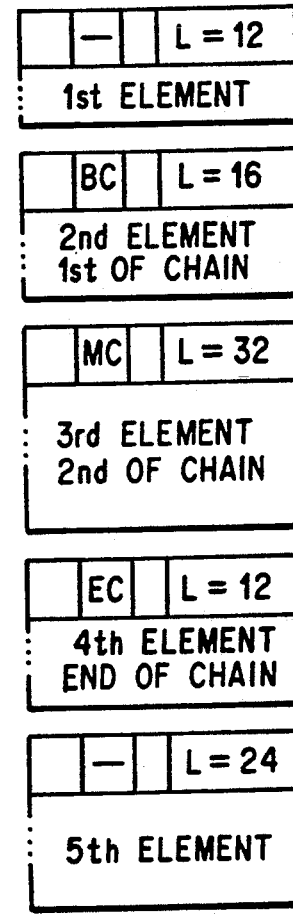

The processing of request elements by a server may take place either synchronously or asynchronously depending on whether or not command chaining is in effect. Normally a server may process requests in any order that makes sense to the server (asynchronously). However, there are also times when a client wishes to have the server process the requests in the order in which they have been submitted (synchronously). Command chaining is used for this purpose. Whenever the command chaining field is set in a request, it means that the processing of the next element in a chain cannot begin until the server and/or device has completed processing the current request element and has returned the appropriate reply to the client. Chaining is indicated by setting the chain indicators in an element to the values BC=Beginning of chain, MC=Middle of chain, and EC=End of chain. This is illustrated in FIG. 11. Processing of requests then resumes with the next request element in the chain. This action continues until all elements in a chain have been processed, or an error condition is encountered. When an error condition is encountered, an error element is returned and the remaining request elements within the chain are discarded.

Data Chaining

Often it is necessary to gather data from several non-contiguous areas of memory and transfer it to a single destination (a write) or, conversely, to transfer data from a single source and scatter it into several non-contiguous areas of memory (a read). This is commonly referred to as data chaining. The SCB architecture supports two methods of data chaining: direct and indirect.

Direct Data Chaining

In direct data chaining, each non-contiguous data area is described by an entry in a chaining list. The entry contains a byte count and an address pointer to a data area. After each data area described by an entry is transferred, the next entry in the list is processed. This action continues, until all the entries in the list have been processed, or no more data exits. Direct data chaining is invoked through the use of the Read List and Write List function codes. The format of a read list element for direct data chaining is shown in FIG. 12.

Indirect Data Chaining

Figure 13:
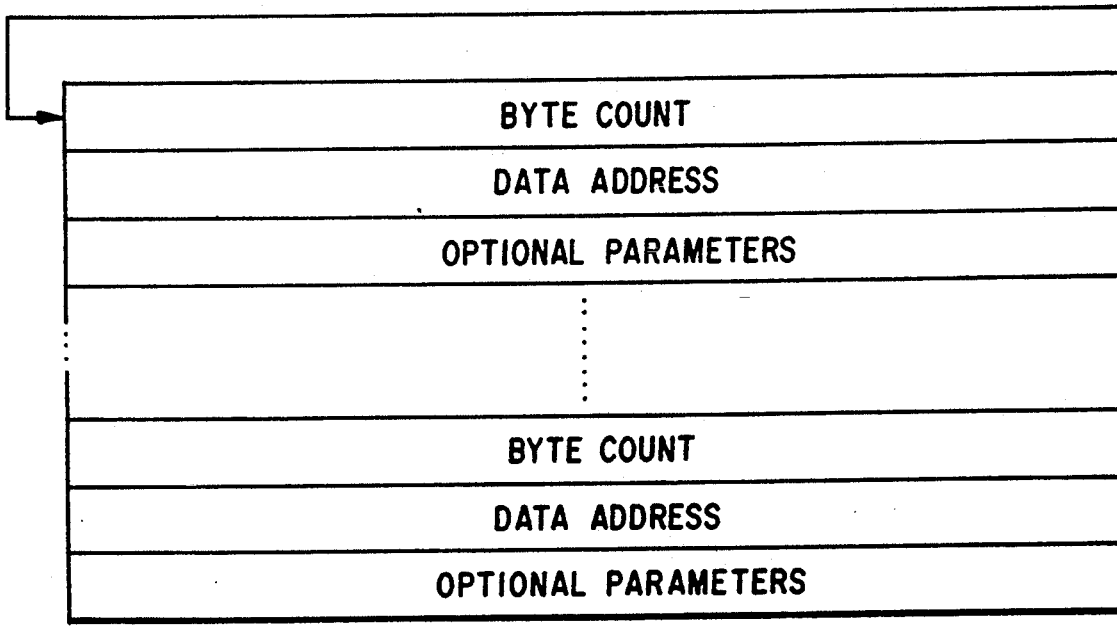
FIG. 13 is a diagram showing the format of control blocks used for indirect data chaining.

Indirect data chaining is similar to direct data chaining except for the location of the chaining list. The list is not part of the request element. Instead the list is kept separate and is referenced by means of an indirect list pointer in the value field of the request element. Indirect data chaining is invoked by setting the indirect flag in a Read or Write List request element. The format of a read list element for indirect data chaining is shown in FIG. 13.

Using Notification and Wait

A client can request notification when an element is about to be processed by setting the notification flag in the type field of the appropriate request element. This causes the server to return an event notification element with the source, destination, and correlation identifier of the element containing the notification flag in its value field to the client.

Figure 14:
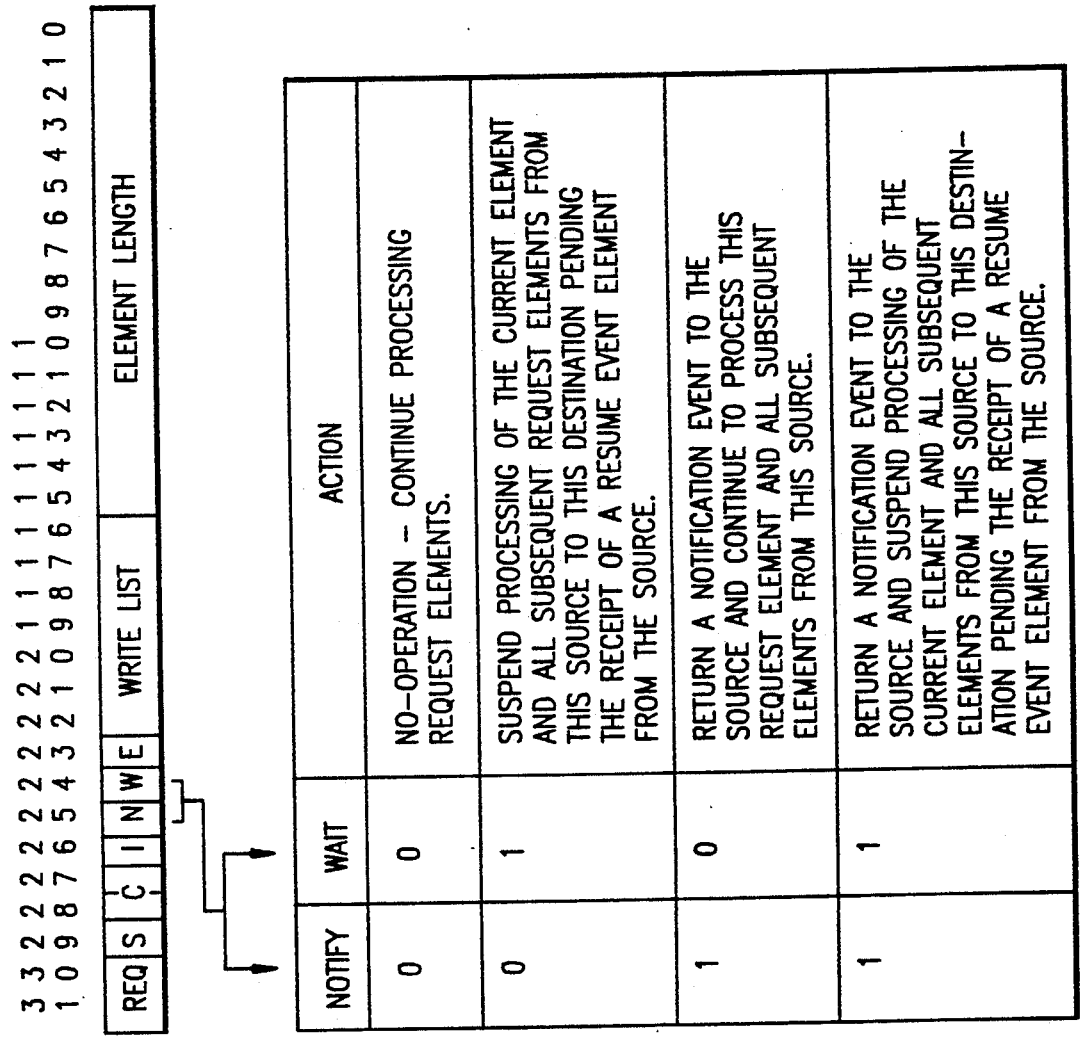
FIG. 14 is a diagram showing the location of the notify and wait bits.

A client can suspend the processing of a set of request elements at a particular point in the list by setting the wait flag in the type field of the appropriate request element prior to submitting it to the Delivery Service. This causes the server to suspend further processing of request elements, to return an event notification element with the correlation identifier of the element containing the suspend flag in its value field, and to wait for a resume event from the originating client before continuing. The original request element containing the wait flag is not processed until the resume event is received from the client. FIG. 14 shows the various combinations of usage for notification and wait.

While the invention has been particularly shown and described with reference to preferred embodiments, it will be understood by those skilled in the art that various changes in detail may be made therein without departing from the spirit, scope, and teaching of the invention. For example, there are many queueing techniques known in the art, at least some of which could be substituted for the FIFO circular queue used in the preferred embodiment. Likewise, the format of the control element could be varied. Accordingly, the invention herein disclosed is to be limited only as specified in the following claims.

We claim:

1. An apparatus within a system for asynchronous transfer of self-describing control elements representing requests, replies, or asynchronous notification between entities located in different units or the system and for asynchronous transfer of data between said entities, said system comprising:
   first type unit, said first type unit further comprising at least one processor;
   a second type unit, said second type unit further comprising at least one subsystem, which may have attached devices;
   an interface bus, interconnecting said first and second type units;
   a distributed pipe between said first type unit and said second type unit, said distributed pipe further comprising shared memory distributed among each of said units;
   buffer means to store data from said shared memory relating to said control elements independent of said pipes and to transfer said stored data to and from said units, each of said first and second type units further comprising:
      at lest one entity;
      a delivery send mechanism for asynchronous enqueuing and sending one of said control elements and said stored date; and
      a delivery receive mechanism for asynchronous dequeuing and receiving one of said control elements and said stored date.

2. An apparatus, as in claim 1, wherein said pipe is a circular queue.

3. An apparatus, as in claim 1, wherein said pipe is a FIFO (first-in/first-out) queue.

4. An apparatus, as in claim 1, wherein said pipe contains control elements for a plurality of entity pairs.

5. An apparatus, as in claim, 1 wherein said delivery send mechanism further includes means to signal the state of said distributed pipe to said delivery receive mechanism in a different one of said unit types when there are state changes in said distributed pipe.

6. An apparatus, as in claim 1, wherein said delivery send mechanism further includes means to signal the state of said distributed pipe to said delivery receive mechanism in a different one of said unit types to examine the state of the distributed pipe at predetermined time intervals.

7. An apparatus, as in claim 1, wherein said control elements further comprise a fixed length portion and a variable length portion, said fixed length potion further comprising a type field for describing the type of information in said control element, a length field containing the length of said control element, a source field describing the source of said control element, a destination field describing the destination of said control element, and a correlation field for correlating requests with replies.

8. An apparatus, as in claim 7, wherein said variable length portion contains data.

9. An apparatus, as in claim 7, wherein:
   said variable length portion further comprises a field having a command for immediate execution by an attached device; and
   said type field further comprises an immediate command identifier;
   whereby said entity sending said immediate command can encapsulate commands within a control element and pass said immediate command through said distributed pipe.

10. An apparatus, as in claim 7, wherein said unit containing the entity sending the control element further comprises buffer storage for holding data external to said distributed pipe, and said control elements further having fields to identify the location of data in said buffer which is associated with said control element.

11. An apparatus, as in claim 10, wherein:
   said variable length portion further comprises a field having an address of a buffer location containing a command for immediate execution by an attached device; and
   said type field further comprises an immediate command identifier;
   whereby said entity sending said immediate command can encapsulate commands within a control element and pass said immediate command through said distributed pipe.

12. An apparatus, as in claim 7, wherein:
   said variable length portion further comprises a field indicating the length of an execute list containing a series of requests to an entity, a field indicating the address of said execute list, and a repetition count indicating the number of times said execute list is to be repeated; and said type field further comprises an execute list identifier.

13. An apparatus, as in claim 12, wherein said type field further comprises notify and wait bits for indicating to the receiving entity synchronization status for the sending entity;

whereby said sending entity is synchronized with said receiving entity.

14. An apparatus, as in claim 1, wherein said delivery send mechanism further comprises means to detect when said distributed pipe is full.

15. An apparatus, as in claim 1, wherein said delivery send mechanism further comprises means to detect when available space in said distributed pipe is insufficient to hold another control element.

16. An apparatus, as in claim 15, wherein said delivery send mechanism further comprises means to place a wrap element at the end of said distributed pipe to indicate the next element should be dequeued.

17. An apparatus as, in claim 1, wherein said delivery receive mechanism further comprises means to detect when said distributed pipe is empty.

18. An apparatus, as in claim 1, wherein said delivery receive mechanism further comprises means to detect when said distributed pipe changes from the empty state to the not empty state.

19. An apparatus, as in claim 1, wherein there are a plurality of distributed pipes.

20. An apparatus, as in claim 19, wherein each first type unit and a second type unit constitute a unit pair, and each unit pair has a pair of distributed pipes associated with said unit pair, said pair of distributed pipes further comprising a first distributed pipe for control elements sent from a first unit of said unit pair to a second unit of said unit pair, and a second distributed pipe for control elements sent from said second unit of said unit pair to said first unit of said unit pair;

whereby each of said unit pairs operate in full duplex mode.

21. The apparatus as defined in claim 1, wherein there is a plurality of second type units, and wherein there is a distributed pipe between two of said second type units.

22. An apparatus within a system for asynchronous transfer of self-describing control elements representing requests, replies or asynchronous notification between entities located in different units of the system and for asynchronous transfer of data between said entities, said system comprising:

a first type unit, said first type unit further comprising at lest one processor;

more than one second type unit, each said second type unit further comprising at least one subsystem, which may have attached devices;

an interface bus interconnecting said units;

at least one distributed pipe, each distributed pipe being distributed between two of said units, each said distributed pipe further comprising shared memory distributed among each of said units:

buffer means to store data from said shared memory relating to said control elements independent of said distributed pipes and to transfer said stored data to and from said units, each of said second type units further comprising;

at least one entity;

a delivery send mechanism for sending one of said control elements and said stored data; and a delivery receive mechanism for receiving one of said control elements and said stored data;

wherein said entity sending said control element is in a subsystem, and said entity receiving said control element is in a subsystem.

23. A method for asynchronously transferring self-describing control elements representing requests, replies, or asynchronous notification between units in a system, comprising the steps of:

interconnecting units, comprising at least one processor and at least one subsystem, with an interface bus;

sharing memory physically distributed between said units as a distributed pipe;

providing a buffer separate from said pipe to store data from distributed memory relating to said control elements independent of said pipe;

asynchronously enqueuing and sending said control elements and the stored data from a sending unit, said control elements addressed to a receiving unit, to said distributed pipe; and asynchronously dequeuing receiving said control elements and the stored data by said receiving unit, said control elements being addressed by said sending unit, from said distributed pipe.

24. A method, as in claim 23, wherein said control elements are written to and read from said distributed pipe as a circular queue.

25. A method, as in claim 23, wherein said control elements are written to and read from said distributed pipe as a FIFO queue.

26. A method, as in claim 23, including the further step of signalling with state logic said receiving mechanism in a different one of said unit types with said sending mechanism when a control element is placed on said distributed pipe.

27. A method, as in claim 23, including the further step of signalling said delivery receive mechanism with said delivery send mechanism to examine the state of the distributed pipe at predetermined time intervals.

28. A method for asynchronously transferring self-describing control elements representing requests, replies, or asynchronous notification between units in a system, comprising the steps of:

interconnecting subsystem units with an interface bus;

sharing memory physically distributed between said units as a distributed pipe;

providing a buffer separate from said pipe to store data from said stored memory relating to said control elements independent of said pipe, asynchronously sending said control elements and said data from a sending unit, said control elements addressed to a receiving unit, to said distributed pipe; and asynchronously receiving said control elements and said data by said receiving unit, said control elements addressed by said sending unit, from said distributed pipe.

29. A method, as in claim 28, wherein said control elements are written to and read from said distributed pipe as a circular queue.

30. A method, as in claim 28, wherein said control elements are written to and read from said distributed pipe as a FIFO queue.

31. A method, as in claim 28, including the further step of signalling with state logic said receiving mechanism in a different one of said unit types with said sending mechanism when there are state changes in said distributed pipe.

32. A method, as in claim 28, including the further step of signalling with state logic said delivery receive mechanism in a different one of said unit types with said delivery send mechanism to examine the state of the distributed pipe at predetermined time intervals.

* * * * *

UNITED STATES PATENT AND TRADEMARK OFFICE
CERTIFICATE OF CORRECTION

PATENT NO. : 5,325,492
DATED : June 28, 1994
INVENTOR(S) : Bonevento, et al.

It is certified that error appears in the above-indentified patent and that said Letters Patent is hereby corrected as shown below:

Col. 17, line 51: Change [or] to --on--

Col. 17, line 54: Please add --a-- before "first type"

Col. 18, line 3: [lest] should be --least--

Col. 18, line 9: Please change [date] to --data--

Col. 18, line 16: "claim, 1" should read --claim 1,--

Col. 19, line 55: Please change [lest] to --least--

Signed and Sealed this

Seventh Day of February, 1995

Attest:

BRUCE LEHMAN

Attesting Officer     Commissioner of Patents and Trademarks